(12) United States Patent
Stingl

(10) Patent No.: US 7,592,763 B1
(45) Date of Patent: Sep. 22, 2009

(54) MOTOR RELAY OPERATION

(76) Inventor: David A. Stingl, PMB # 325, 21010 Southbank St., Great Falls, VA (US) 20165

( * ) Notice: Subject to any disclaimer, the term of this patent is extended or adjusted under 35 U.S.C. 154(b) by 219 days.

(21) Appl. No.: 11/704,626

(22) Filed: Feb. 9, 2007

Related U.S. Application Data

(60) Provisional application No. 60/771,475, filed on Feb. 9, 2006.

(51) Int. Cl.
*H02P 1/00* (2006.01)

(52) U.S. Cl. .................. 318/284; 318/285; 318/291; 318/293; 318/300

(58) Field of Classification Search .......... 318/284, 318/285, 291, 293, 300
See application file for complete search history.

(56) References Cited

U.S. PATENT DOCUMENTS

| | | | | |
|---|---|---|---|---|
| 3,766,537 A | * | 10/1973 | MacFarlane | 340/508 |
| RE29,917 E | * | 2/1979 | Kumakawa et al. | 326/33 |
| 4,467,388 A | * | 8/1984 | Thoe | 361/145 |
| 4,496,888 A | * | 1/1985 | Campbell | 318/284 |
| 4,630,210 A | * | 12/1986 | Salazar et al. | 700/63 |
| 4,631,681 A | * | 12/1986 | Salazar et al. | 705/410 |
| 6,173,424 B1 | * | 1/2001 | Voshell et al. | 714/718 |
| 6,446,226 B1 | * | 9/2002 | Voshell et al. | 714/718 |

* cited by examiner

*Primary Examiner*—Bentsu Ro
*Assistant Examiner*—David S Luo
(74) *Attorney, Agent, or Firm*—James Creighton Wray; Meera P. Narasimhan

(57) ABSTRACT

A motor receives power through two or more relays connected to a power source. A switch-operated logic circuit is powered by a relay power source and connects to the relays. To start the motor, the switch is pressed, causing the logic circuit to close the relays sequentially. When all the relays are closed, the motor will start. If the motor starts before the logic circuit closes all of the relays, the motor is stopped and an indication is provided that the relays that have not yet been closed have failed. Otherwise, the motor runs until the switch is pressed again, causing the logic circuit to open the relays and stop the motor. The sequence in which the relays are closed is then changed. Each relay is alternately made the last in the closing sequence, therefore testing each relay in turn for failure.

8 Claims, 2 Drawing Sheets

- close switch for starting motor

- close relay A from power source to motor

- if motor starts, open relay A, stop motor and provide notice

- if motor does not start

- close relay B from power source to motor

- motor runs

- upon stopping motor
  change sequence of relay closures for starting motor from A, B to B, A

FIG. 2

MOTOR RELAY OPERATION

This application claims the benefit of U.S. Provisional Application No. 60/771,475 filed Feb. 9, 2006, which is hereby incorporated by reference in its entirety.

BACKGROUND OF THE INVENTION

Electric current relays often arc upon opening a closed relay. To avoid problems caused by arcing, relays are often spring-loaded to rapidly separate the poles when the relays are opened and sometimes to rapidly close the poles when the relays are closed.

Continued operation of the relays may build deposits on or rearrange material of the relay poles, promoting arcing and eventually fusing and welding the poles shut. The continued closed condition of one or two or more relays necessary for completing a circuit may not be noticeable, because the relays are often covered and because multiple moving parts in the relays may hide the condition of unwanted permanent closure of one of the relays. Under that condition one functioning relay may make or break the circuit which is intended to be made or broken by two relays.

Needs exist for improved relay operations.

SUMMARY OF THE INVENTION

An electric motor is provided with two or more relays to complete a power circuit between the motor and a power source.

The electric motor is started by closing a first relay to a power source, sequentially closing a second relay to the power source, and starting and running the motor.

If the motor starts after closing the first relay, the new system opens the first relay, stopping the motor and noticing a failure, such as by an alarm or message. Sensing whether the motor has started can be accomplished in any of a number of ways well known in the art, for example mechanically or electronically, by detecting flow, pressure, or vacuum, depending in part on what the motor is driving.

If the motor starts after closing the second relay, running the motor continues as intended.

After stopping the motor, the order of relay closings for starting the motor is reversed, and starting the motor by first closing the second relay and subsequently closing the first relay completes the power circuit to the motor.

If in this sequence the motor starts after first closing the second relay, the second relay opens, stopping the motor and noticing a failure.

If the motor starts following the second step of closing the first relay, continuing running the motor operates as intended.

After stopping the motor, the sequence order of the first and second relays is again reversed for closing the first relay before closing the second relay and for stopping the motor and noticing a failure if the motor starts after closing only the first relay.

If the motor starts only after the two relays are closed, the motor continues to run until it is shut down at the end of its use.

Upon that shut-down, the order of closing the relays is changed for the next starting. In that way, the proper operation of the relays is tested upon every starting of the motor.

Each relay is tested upon sequential startings of the motor.

If one relay is welded or fused in the one position, that failure is sensed for correction and relay repair or replacement within a short time.

Switching on a motor fed electricity through first and second relays in series comprises closing the first relay and subsequently closing the second relay, starting the motor and running the motor.

If the motor starts after closing the first relay, the first relay is opened, stopping the motor, and a failure is noticed.

If the motor starts after closing the second relay, the motor is run.

After stopping the motor, change the order of closing the relays.

A new motor relay operation method provides a power source, two or more relays connected to the power source and to a motor that receives power through the relays, a logic circuit a logic circuit connected to the relays, a switch connected to the logic circuit, and a relay power source connected to the logic circuit.

The switch is pressed, causing the logic circuit to close one relay and then the other relays sequentially with a delay between each closing, until all of the relays are closed, causing the motor to start, or the motor starts before all the relays are closed. If the motor starts before all relays are closed, that is detected and the motor is stopped, for example by opening the relays, and a failure is noticed. Otherwise the motor is allowed to run and the switch is then pressed, which causes the logic circuit to open the relays and stop the motor. The sequence in which the relays will be closed when the switch is next pressed is then changed such that the last relay to be closed will be one of the relays for which the greatest amount of time has passed since it was most recently the last relay to be closed in the sequence.

The method may activate an alarm or send a message to notice a failure.

The sequence of relay closing is changed according to an algorithm that allows all of the relays to be tested for failure in the least number of motor starts. Typically this algorithm will dictate that the relays are closed in the order in which they were last the last relay to be closed in the sequence. So the relay most recently closed last in the sequence is closed first, the relay closed last second-most recently is closed second in the sequence, etc.

The invention provides a motor relay operation apparatus including a power source, two or more relays connected to the power source, a motor that receives power from the power source through the relays, a logic circuit connected to the relays, a switch connected to the logic circuit, and a relay power source connected to the logic circuit. The switch controls the logic circuit. The logic circuit closes the relays sequentially with a delay between each closing, until all of the relays are closed and the motor starts, or the motor starts before all relays are closed.

If the motor starts before all relays are closed, the motor is stopped and a failure is noticed. Otherwise, the motor runs until the switch is pressed, causing the logic circuit to open the relays and stop the motor and change the sequence in which the relays will be closed when the switch is next pressed. The sequence will be such that the last relay to be closed will be one of the relays for which the greatest amount of time has passed since it was most recently the last relay to be closed in the sequence.

The invention also includes an alarm for noticing the failure or a messaging device for noticing the failure.

The sequence of relay closing is changed according to an algorithm that allows all of the relays to be tested for failure in the least number of motor starts. Typically this algorithm will dictate that the relays are closed in the order in which they were last the last relay to be closed in the sequence. So the relay most recently closed last in the sequence is closed first, the relay closed second-most recently is closed second in the sequence, etc.

These and further and other objects and features of the invention are apparent in the disclosure, which includes the above and ongoing written specification, with the drawings.

BRIEF DESCRIPTION OF THE DRAWINGS

FIG. 2 is a sequence diagram.

DETAILED DESCRIPTION OF THE PREFERRED EMBODIMENTS

Figure 1:
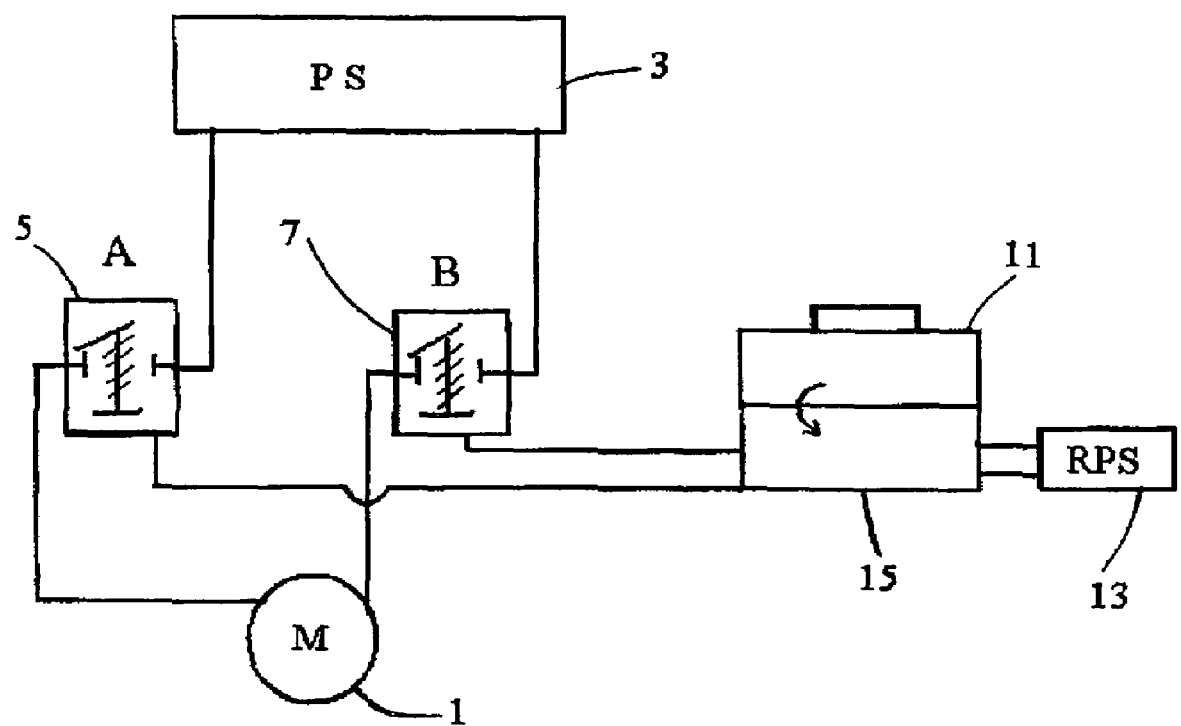
FIG. 1 shows relay operation.

Referring to FIG. 1, a motor 1 receives power from a power source 3 through a first relay 5(A) and a second relay 7(B).

A switch 11 controls a logic circuit 15.

The logic circuit 15 operating from a relay power source 13 closes relay 5 and then, after a delay, relay 7. The motor continues to run until the switch is pressed, causing the logic circuit to open the relays, stopping the motor. The logic circuit then changes the order of relay closing for the next pressing of the switch and starting of the motor.

More than two power lines and relays may be connected between the motor and the power source. In that case the logic circuit controls the closing sequence of the relays and changes the closing sequence after the motor is stopped.

While the invention has been described with reference to specific embodiments, modifications and variations of the invention may be constructed without departing from the scope of the invention.

I claim:

1. A method of motor relay operation comprising the steps of:
   providing a power source,
   providing two or more relays connected to the power source,
   providing a motor that receives power from the power source through the relays,
   providing a logic circuit connected to the relays,
   providing a switch connected to the logic circuit,
   providing a relay power source connected to the logic circuit,
   pressing the switch, causing the logic circuit to close one relay and then the other relays sequentially with a delay between each closing, until all of the relays are closed, causing the motor to start, or the motor starts before all relays are closed,
   detecting if the motor starts before all relays are closed, and if so stopping the motor and noticing a failure, otherwise allowing the motor to run and then pressing the switch, causing the logic circuit to open the relays, causing the motor to stop, and change the sequence in which the relays will be closed when the switch is next pressed such that the last relay to be closed will be one of the relays for which the greatest amount of time has passed since it was most recently the last relay to be closed in the sequence.

2. The method of claim 1, wherein the noticing a failure further comprises activating an alarm.

3. The method of claim 1, wherein the noticing a failure further comprises sending a message.

4. The method of claim 1, wherein the change in the sequence further comprises a change according to an algorithm that allows all of the relays to be tested for failure in the least number of motor starts.

5. A motor relay operation apparatus comprising:
   a power source,
   two or more relays connected to the power source,
   a motor that receives power from the power source through the relays,
   a logic circuit connected to the relays,
   a switch connected to the logic circuit,
   a relay power source connected to the logic circuit,
   wherein the switch controls the logic circuit,
   wherein the logic circuit closes one relay and then the other relays sequentially with a delay between each closing, until all of the relays are closed, causing the motor to start, or the motor starts before all relays are closed,
   wherein if the motor starts before all relays are closed, the motor is stopped and a failure is noticed,
   wherein if the motor starts after all the relays were closed, the motor runs until the switch is pressed, causing the logic circuit to open the relays and stop the motor and change the sequence in which the relays will be closed when the switch is next pressed such that the last relay to be closed will be one of the relays for which the greatest amount of time has passed since it was most recently the last relay to be closed in the sequence.

6. The motor relay operation apparatus of claim 5, further comprising an alarm for noticing the failure.

7. The motor relay operation apparatus of claim 5, further comprising a messaging device for noticing the failure.

8. The motor relay operation apparatus of claim 5, wherein the change in the sequence further comprises a change according to an algorithm that allows all of the relays to be tested for failure in the least number of motor starts.

\* \* \* \* \*